No. 834,575. PATENTED OCT. 30, 1906.
W. A. HENDRYX.
PRECIPITATING CELL.
APPLICATION FILED JAN. 17, 1906.

2 SHEETS—SHEET 1.

Witnesses:
Geo. E. Garrett
G. Sargent Elliott
    —By
        H. S. Bailey.

Inventor:
Wilbur A. Hendryx.

Att'y.

No. 834,575.  
PATENTED OCT. 30, 1906.  
W. A. HENDRYX.  
PRECIPITATING CELL.  
APPLICATION FILED JAN. 17, 1906.

2 SHEETS—SHEET 2.

Witnesses:

Inventor:  
Wilbur A. Hendryx.

By H. S. Bailey  
Att'y

UNITED STATES PATENT OFFICE.

WILBUR A. HENDRYX, OF DENVER, COLORADO.

PRECIPITATING-CELL.

No. 834,575.      Specification of Letters Patent.      Patented Oct. 30, 1906.

Application filed January 17, 1906. Serial No. 296,565.

*To all whom it may concern:*

Be it known that I, WILBUR A. HENDRYX, a citizen of the United States of America, residing in the city and county of Denver and State of Colorado, have invented a new and useful Precipitating-Cell, of which the following is a specification.

In my prior application, Serial No. 267,785, filed June 30, 1905, I have described and claimed an apparatus for the separation of gold, silver, copper, and other metallic values from solutions containing the same, said device comprising in its preferred form a frame carrying a filtering medium and electrodes or equivalent precipitating means disposed within said frame and in position to be covered or enveloped by said filtering medium, means being provided for causing the metal-bearing solution to pass through the filtering medium and into contact with the precipitating means.

The present invention relates to apparatus of this character, hereinafter referred to as "precipitating-cells," the object of the invention being to provide a precipitating-cell which shall be inexpensive in construction and efficient and economical in operation.

For a full understanding of my invention reference is made to the accompanying drawings, wherein—

Figure 1:
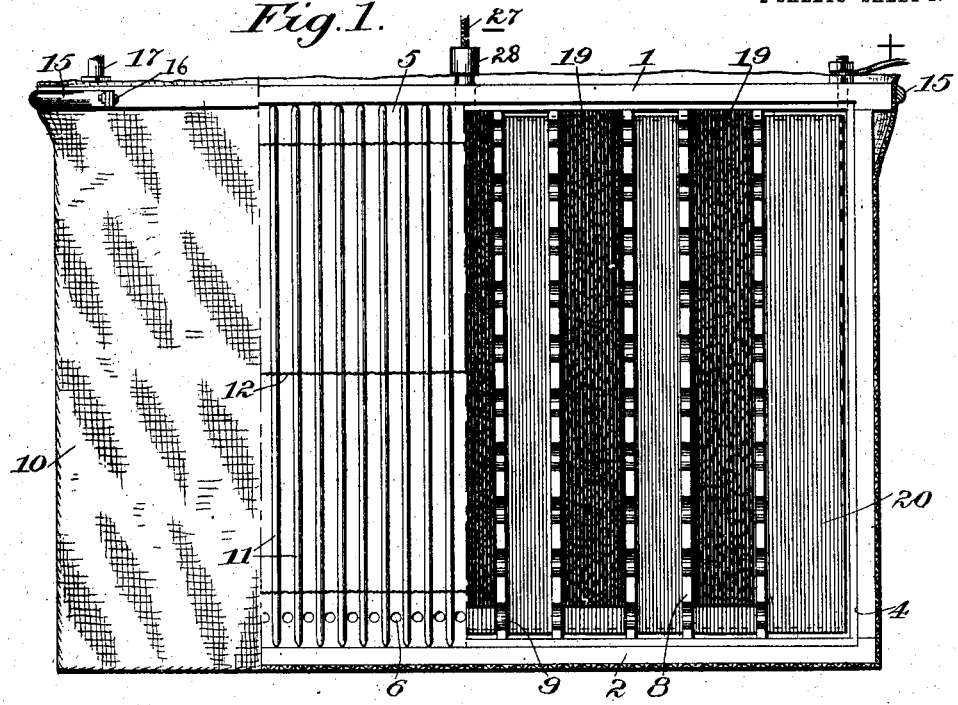
Figure 2:
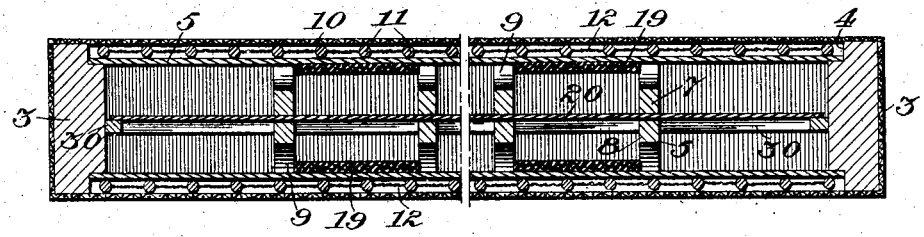
Figure 4:
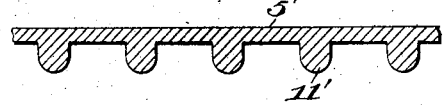
Figure 3:
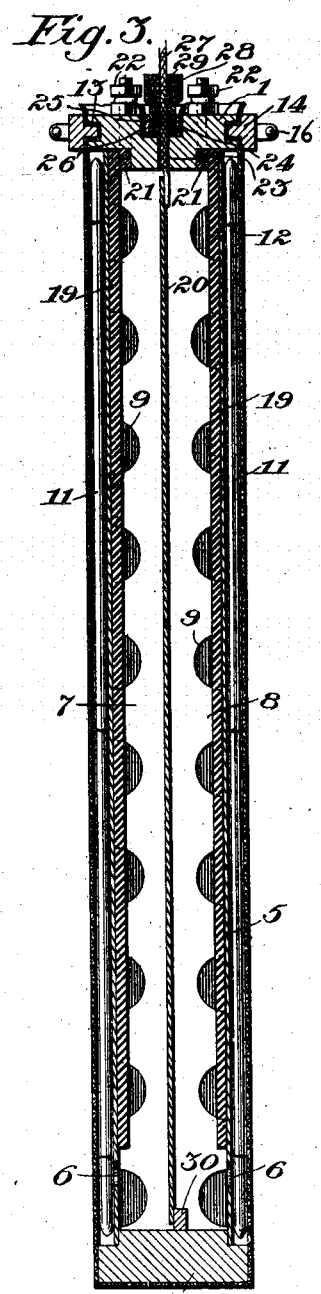
Figure 5:
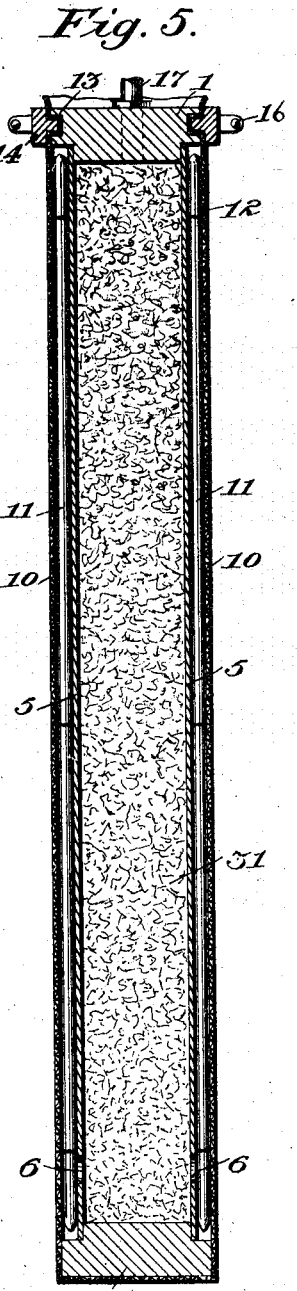

Figure 1 is a side elevation of my preferred form of precipitating-cell, parts being broken away. Fig. 2 is a horizontal section showing portions of the cell on an enlarged scale. Fig. 3 is a transverse vertical section of the cell on the same scale as Fig. 2. Fig. 4 is a detail in horizontal section of a modified form of side plate, and Fig. 5 is a transverse vertical section of a modified form of cell.

Referring to Figs. 1, 2, 3, the cell is shown as provided with a frame comprising upper and lower members 1 2 and two end members 3 3, said several members being rabbeted on each side, as shown at 4, to receive side plates 5 5, which may be of wood, asbestos-board, or any other suitable material. These side plates are provided at their lower portions with apertures 6 or with equivalent means for providing free communication with the interior of the cell. Preferably I provide means within the cell for supporting the side plates 5 at numerous points, such means preferably comprising a plurality of supporting-strips 7 8, arranged on each side of the median line of the cell and cut away, as indicated at 9, in order to afford free liquid communication throughout the cell.

Exteriorly the frame is covered or enveloped by a layer 10, which constitutes a filtering medium and may conveniently consist of canvas in the form of a sack, as indicated in the figures, such filtering medium being supported and spaced from the side plates 5 in any suitable manner. As one such supporting means I have shown a number of rods 11, conveniently of wood, loosely united in substantially parallel relation by cords or equivalent devices 12. As an equivalent means for supporting the filtering medium I may provide side plates 5', having integral vertical ribs 11', as illustrated in Fig. 4. I prefer to secure the sack 10 at its top in grooves 13, formed in the sides of the upper frame member 1, the sack being secured therein by strips 14, preferably of T shape in cross-section, as clearly shown in Fig. 3. Said strips 14 are united by yokes 15, passing around the ends of the cell and capable of adjustment by bolts 16.

17 represents a pipe whereby communication may be established between the interior of the cell and a suitable pump or equivalent device, serving to cause a flow of the metal-bearing solution through the filtering medium and into contact with the precipitating means within the cell.

In the specific form shown in Figs. 1, 2, 3 I have shown such precipitating means as comprising anodes 19 and a cathode 20, said electrodes being adapted for connection to an external source of current. The anodes 19, which preferably consist of plates of graphite, are disposed against the inner surfaces of the side plates 5 in the spaces between the supporting-strips 7 7 and 8 8. These anodes bear against contact-bars 21, lying in recesses on the inner side of the upper frame member 1, as shown in Fig. 3, said contact-bars having metallic connection with the anode-binding posts 22. The cathode 20 preferably consists of a metallic sheet or plate adapted for insertion between the supporting-strips 7 and 8, said strips serving also to guide the cathode to its proper position and to support it in use. Any suitable conductive material may be employed as a cathode, preferably a metal—such as copper, tin or terne plate, or iron—but my invention is not limited in this respect. The cathode-surface may be treated with graphite to prevent too close adherence of the deposited metal.

In order that the cathode may be quickly removed to recover the metallic values, I provide in the upper frame member 1 a longitudinal slot 23, having an enlarged portion 24, said slot being closed in use by a strip 25, having a packing 26, which may conveniently be of canvas. The cathode connection 27 passes through a nipple 28, carried by the strip 25, and is preferably sealed therein, as indicated at 29. The nipple 28 serves also as convenient means for removing the strip 25, together with the cathode-plate 20.

30 represents a guide-strip for the bottom of the cathode 20.

The operation of the device thus far described is as follows: The precipitating-cell, or, preferably, a plurality of similar cells, is mounted in a suitable extraction-tank, preferably in position to be entirely submerged in the body of ore-pulp or metal-bearing solution contained therein. Such ore-pulp is preferably prepared with a cyanid or other solvent solution, as is well understood. The pulp or liquid is preferably circulated and in case a cyanid solution is used is preferably aerated by any convenient means—as, for instance, by means of the apparatus shown in my prior application above referred to. The several cells are operatively connected with the suction-line of a suitable pump, whereby the metal-bearing solution is carried into and through the cells, the suspended matter being retained by the filtering medium. The metals contained in solution are partially or wholly separated, being precipitated upon the cathode, and the depleted solution may be returned to the tank or may be otherwise treated. At suitable intervals the pulp or slime adhering to the outside of the filtering medium may be detached therefrom, as by reversing the movement of the pump, or, preferably, as described in my prior application above referred to, by forcing air into the interior of the precipitating-cells and permitting it to escape through the filtering media.

The construction of my improved precipitating-cells is such that while the entire lateral area of the filtering medium is active in transmitting the metal-bearing solution said solution can enter the interior of the cell only at its bottom through the apertures 6 in the side plates 5 and is withdrawn therefrom through the pipe 17 at the top. It results from this construction that the whole body of the liquid is caused to traverse the entire cell in contact with the precipitating means therein, such construction being highly advantageous as affording the most efficient operating conditions for the cell.

In Fig. 5 I have shown a simplified form of cell the construction of which will be readily understood without further description, the several parts being indicated by reference-numerals corresponding to those in Figs. 1, 2, 3 and being constructed and assembled as above described. The anodes and cathodes adapted for connection to an external source of current are, however, omitted, their place being supplied by a precipitating agent, (indicated by the numeral 31.) Such precipitating agent is preferably in more or less divided form in order to present a relatively large surface to the liquid entering at 6 and passing out through the nipple 17. The precipitating agent may consist of metallic zinc or aluminium or other relatively electropositive metal, of an alloy containing such metal, of a mechanical mixture of such metal with lead, carbon, or other relatively electronegative element, or I may use a galvanic couple of any form or kind without external connection to a source of current. Each of these precipitating agents, as well as the electrodes above described, are intended to be embraced in the meaning of the term "precipitating means" as herein employed.

I do not herein claim broadly a cell comprising precipitating means and a filtering cover or envelop for the same, such invenbeing claimed in my prior application Serial No. 267,785, above referred to.

I claim—

1. A precipitating-cell comprising an open frame, a filtering medium carried thereby, precipitating means within said frame, and inlet and outlet apertures for liquid oppositely disposed with respect to said precipitating means, substantially as described.

2. A precipitating-cell comprising a frame, a filtering medium carried thereby, precipitating means within said frame, and deflecting side plates for directing the flow of liquid in said frame, substantially as described.

3. A precipitating-cell comprising a frame, a filtering medium carried thereby, precipitating means within said frame, and apertured side plates for directing the flow of liquid in said frame, substantially as described.

4. A precipitating-cell comprising a frame, a filtering medium carried thereby, precipitating means within said frame, an outlet for liquid in the upper part of said frame, and side plates providing an inlet for liquid in the lower portion of the frame, substantially as described.

5. A precipitating-cell comprising a frame, a filtering medium carried thereby, precipitating means within said frame, and deflecting side plates interposed between the filtering medium and the precipitating means, substantially as described.

6. A precipitating-cell comprising a frame, a filtering medium carried thereby, supports for said filtering medium, precipitating means within said frame, and deflecting side plates interposed between the filtering medium and the precipitating means, substantially as described.

7. A precipitating-cell comprising a frame, a filtering medium carried thereby, precipitating means within said frame, deflecting side plates interposed between the filtering medium and the precipitating means, and supporting-rods between said side plates and the filtering medium, substantially as described.

8. A precipitating-cell comprising an open frame, a filtering medium carried thereby, electrodes within said frame, and inlet and outlet apertures for liquid oppositely disposed with respect to said electrodes, substantially as described.

9. A precipitating-cell comprising a frame, a filtering medium carried thereby, electrodes within said frame, and side plates for directing the flow of liquid through said frame, substantially as described.

10. A precipitating-cell comprising a frame, a filtering medium carried thereby, an anode and cathode within said frame, and an aperture in said frame in alinement with said cathode, substantially as described.

11. A precipitating-cell comprising a frame, a filtering medium carried thereby, an anode and cathode within said frame, an aperture in said frame in alinement with said cathode, and a closure for said aperture, substantially as described.

12. A precipitating-cell comprising a frame, a filtering medium carried thereby, precipitating means within said frame, deflecting side plates for directing the flow of liquid through said frame, and supporting-strips for said side plates, substantially as described.

13. A precipitating-cell comprising a frame, a filtering medium carried thereby, precipitating means within said frame, deflecting side plates for directing the flow of liquid through said frame, and apertured supporting-strips for said side plates, substantially as described.

14. A precipitating-cell comprising a frame, precipitating means therein, a filtering-envelop for said frame and precipitating means, and a closure for said envelop, said closure embracing the sides and ends of said frame, substantially as described.

In testimony whereof I affix my signature in presence of two witnesses.

WILBUR A. HENDRYX.

Witnesses:
   G. SARGENT ELLIOTT,
   ADELLA M. FOWLE.